United States Patent
Dille et al.

(10) Patent No.: US 9,995,102 B2
(45) Date of Patent: Jun. 12, 2018

(54) MANIFOLD TRAILER HAVING A SINGLE HIGH PRESSURE OUTPUT MANIFOLD

(71) Applicant: FORUM US, INC., Houston, TX (US)

(72) Inventors: Mark C. Dille, Houston, TX (US); Andrew J. Johnson, Corpus Christi, TX (US)

(73) Assignee: FORUM US, INC., Houston, TX (US)

(*) Notice: Subject to any disclaimer, the term of this patent is extended or adjusted under 35 U.S.C. 154(b) by 259 days.

(21) Appl. No.: 14/932,084

(22) Filed: Nov. 4, 2015

(65) Prior Publication Data
US 2017/0122060 A1 May 4, 2017

(51) Int. Cl.
*E21B 33/068* (2006.01)
*B60P 3/22* (2006.01)
*E21B 43/26* (2006.01)

(52) U.S. Cl.
CPC .......... *E21B 33/068* (2013.01); *B60P 3/2205* (2013.01); *E21B 43/26* (2013.01)

(58) Field of Classification Search
CPC ...... E21B 43/26; E21B 33/068; E21B 43/267; E21B 34/02; E21B 21/062; E21B 43/16; E21B 43/25; E21B 19/15; E21B 21/106; E21B 27/00; E21B 28/00; E21B 33/03; E21B 33/06; E21B 41/0085; E21B 43/00; E21B 43/003; B60P 3/2205
See application file for complete search history.

(56) References Cited

U.S. PATENT DOCUMENTS

| | | | |
|---|---|---|---|
| 9,222,345 B2 * | 12/2015 | Conrad | E21B 43/26 |
| 9,568,138 B2 | 2/2017 | Arizpe et al. | |
| 2007/0277982 A1 | 12/2007 | Shampine et al. | |
| 2012/0060929 A1 * | 3/2012 | Kendrick | E21B 21/062 137/1 |
| 2012/0227814 A1 | 9/2012 | Kendrick | |
| 2014/0026965 A1 | 1/2014 | Barrett et al. | |
| 2014/0277772 A1 | 9/2014 | Lopez et al. | |
| 2015/0000766 A1 | 1/2015 | Arizpe et al. | |
| 2017/0130885 A1 | 5/2017 | Arizpe et al. | |

OTHER PUBLICATIONS

International Search Report and Written Opinion for Application No. PCT/US2016/058764 dated Jan. 12, 2017.

* cited by examiner

*Primary Examiner* — James G Sayre
(74) *Attorney, Agent, or Firm* — Patterson & Sheridan, L.L.P.

(57) ABSTRACT

A manifold trailer is provided and includes a chassis, a low pressure piping system disposed along a length of the chassis, and a single high pressure output manifold disposed along the length of the chassis, the high pressure output manifold terminating at a splitter that distributes fluids from the high pressure manifold to a wellhead.

19 Claims, 6 Drawing Sheets

MANIFOLD TRAILER HAVING A SINGLE HIGH PRESSURE OUTPUT MANIFOLD

BACKGROUND

Field

Embodiments of the disclosure generally relate to a trailer utilized in a fracturing operation (also known as a "manifold trailer") having a single high pressure output manifold.

Description of the Related Art

Hydraulic fracturing, or "fracking", is the process of injecting a fluid into a wellbore at a high pressure in order to fracture rock formations to facilitate release of trapped hydrocarbons within the formation. Fracking operations typically use manifold trailers having a piping system attached thereon that provides pressurized fluids to a wellhead at the surface. A low pressure side of the piping system receives fluids from a tank at a low pressure which is routed to a plurality of pumps where the fluid is pressurized to a high pressure (e.g., up to about 20,000 pounds per square inch). The pumps return the pressurized fluid to a high pressure side of the piping system that routes the pressurized fluid to the wellhead.

Conventional manifold trailers include multiple high pressure piping systems that have multiple discharge points. Rigging up a conventional manifold trailer requires the operators to assemble high pressure flowline iron (e.g. piping components such as tubular connectors, tubular swivel connectors, valves, flanges, and piping joints (also known as "pup" joints)) between the manifold trailer and the pumps that couples with other piping preinstalled in parallel along the length of the manifold trailer. The high pressure flowline iron is stacked horizontally and vertically on the manifold trailer to form multiple discrete manifolds while staying within the width of the manifold trailer. The stacking of the multiple discrete manifolds requires tight tolerances to be maintained. In addition, high pressure fluid flowing through the high pressure flowline iron causes the piping components to expand, which may cause binding and/or failure of one or more of the connections between the piping components. Further, the high pressure fluid flowing through the high pressure flowline iron may pulsate, which causes vibrations that may induce cracks or failures in one or more of the connections between piping components and/or the piping components themselves. Finally, in the case of a component replacement, rig-up time and complexity is increased significantly due to the numerous connections and stacked tolerances that have to be addressed between the various piping components of the high pressure flowline iron.

Therefore, there exists a need for a new and/or improved manifold trailer.

SUMMARY

It is therefore an object of the disclosure to provide a manifold trailer having a single output manifold.

In one embodiment, a manifold trailer is provided and includes a chassis, a low pressure piping system disposed along a length of the chassis, and a single high pressure manifold disposed along the length of the chassis, the high pressure manifold terminating at a splitter that distributes fluids from the high pressure manifold to a wellhead.

In another embodiment, a manifold trailer is provided and includes a chassis, a low pressure piping system disposed along a length of the chassis, and a single high pressure manifold comprising a plurality of flow assemblies coupled together in series along the length of the chassis.

In another embodiment, a manifold trailer is provided and includes a chassis, a low pressure piping system disposed along a length of the chassis, and a high pressure manifold comprising a plurality of flow assemblies coupled together in series along the length of the chassis, wherein each of the flow assemblies include an inlet pipe section on each side of the chassis that share a common fluid conduit.

BRIEF DESCRIPTION OF THE DRAWINGS

Having generally described the various embodiments of the disclosure, reference will now be made to the accompanying drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the disclosure include a manifold trailer having a single output manifold and methods of using the same. The manifold trailer is easier to rig up and maintain, improves safety, and reduces failure points when compared to conventional manifold trailers.

Figure 1:
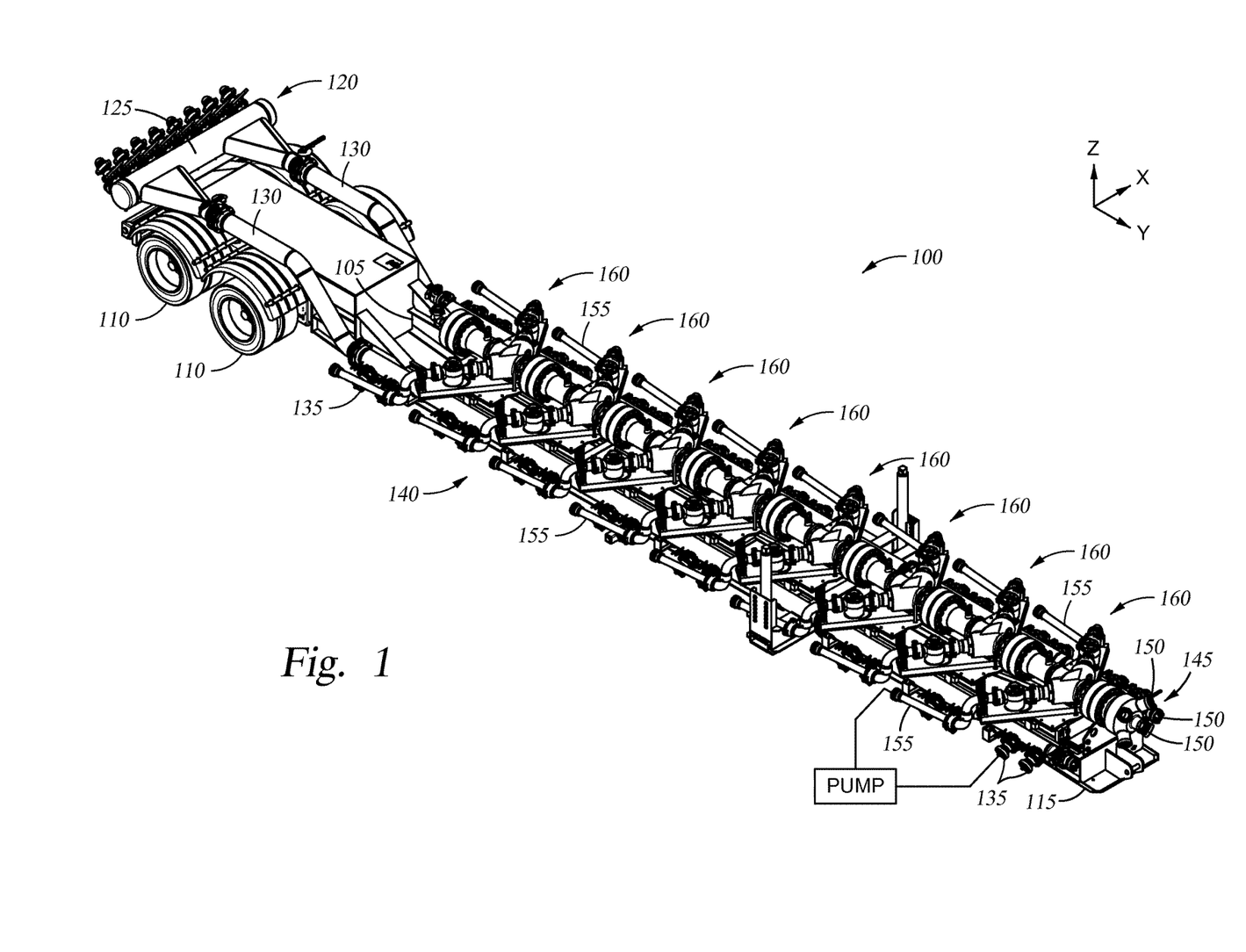
FIG. 1 is a perspective view of one embodiment of a manifold trailer.

FIG. 1 is a perspective view of one embodiment of a manifold trailer 100. The manifold trailer 100 includes a chassis 105, two or more wheels 110, and a hitch 115. The manifold trailer 100 also includes a low pressure piping system 120 and a single high pressure manifold 140.

The low pressure piping system 120 includes an inlet manifold 125, which receives fluids from one or more tanks (not shown), and one or more low pressure conduits 130 that run the length of the chassis 105. The low pressure conduits 130 include a plurality of valves 135 positioned along a length thereof. At least a portion of the valves 135 may be coupled to a pump that pressurizes the fluid from the low pressure piping system 120, which pressurized fluid then flows to the high pressure manifold 140 of the manifold trailer 100. While only one pump is shown, multiple pumps may be coupled to the manifold trailer 100 during operation.

The high pressure manifold 140 is a single fluid conduit that runs the length of the chassis 105 and terminates at a frac head or splitter 145 that distributes fluids to a wellhead tree (not shown) via multiple outlets 150. The pressurized fluid from the pump(s) is pumped into one or more inlet pipe sections 155 that are part of the high pressure manifold 140. The inlet pipe sections 155 are also known as "pup joints"

and may be 4-inch pipe adapted for pressures up to about 20,000 pounds per square inch.

The inlet pipe sections 155 are coupled to a plurality of flow assemblies 160 that are generally installed in series along a length of the chassis 105. The flow assemblies 160, when coupled together, form the single fluid conduit disposed along the length of the chassis 105 that terminates at the splitter 145. The flow assemblies 160 are movably mounted to the chassis 105 as further described below. In one embodiment, the flow assembly 160 that connects directly to the splitter 145 may be fixed in place relative to the chassis 105, while the other flow assemblies 160 are movable relative to the chassis 105.

Figure 2:
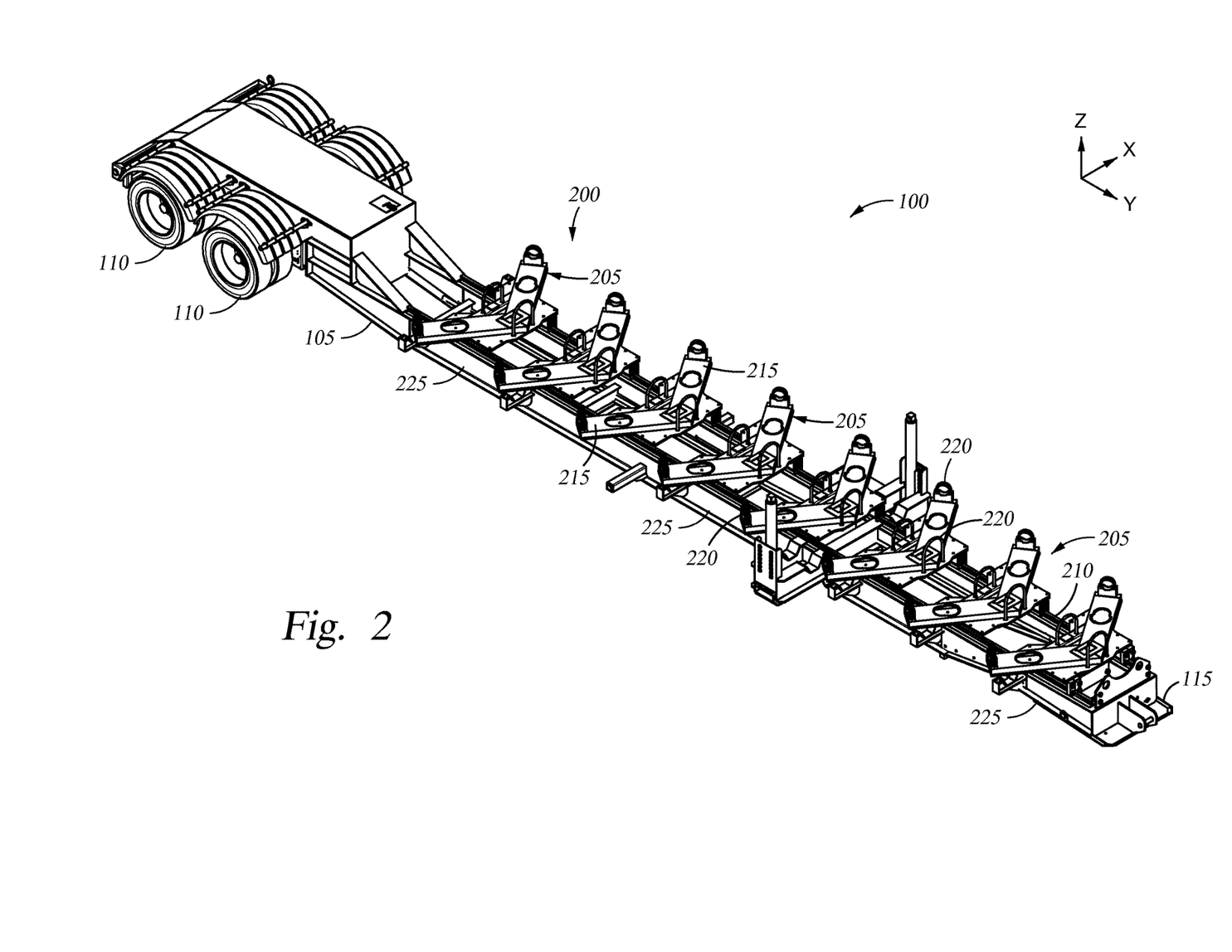
FIG. 2 is a perspective view of the manifold trailer of FIG. 1 with the low pressure piping system and the high pressure manifold removed for clarity.

FIG. 2 is a perspective view of the manifold trailer 100 of FIG. 1 with the low pressure piping system 120 and the high pressure manifold 140 removed to show one embodiment of a mounting structure 200 for the high pressure manifold 140. The mounting structure 200 includes a plurality of wing assemblies 205 coupled to the chassis 105. Each of the wing assemblies 205 may be slidably coupled to the chassis 105 by a rail system 210 that runs along a length of the chassis 105.

Each of the wing assemblies 205 include a support structure comprising one or more plates 215 that are coupled to the rail system 210. The one or more plates 215 may be formed or fitted into a "crow's foot" shaped structure that is coupled to the rail system 210. Fasteners 220, such as U-bolts, may be coupled to the plates 215 and are used to secure the flow assemblies 160 (shown in FIG. 1) thereto.

During transport of the manifold trailer 100, the wing assemblies 205 may be secured to the chassis 105 by locking devices 225. The locking devices 225 secure the wing assemblies 205 to the chassis 105 to prevent movement of the wing assemblies 205 along the rail system 210. However, during operation, the locking devices 225 may be loosened and/or removed such that the wing assemblies 205 are free to move relative to and along the length of the chassis 105 via the rail system 210 (in the Y direction as shown in FIG. 2).

Allowing relative movement of the wing assemblies 205 helps to provide proper alignment of the components of the high pressure manifold 140, including the flow assemblies 160. The proper alignment of the components of the high pressure manifold 140 is an important factor in ensuring a long service life. The ability to slide the components of the high pressure manifold 140 along the chassis 105 relative to each other aids in rig-up or take down of the high pressure manifold 140.

Conventional trailers typically hard-mount the high pressure flowline iron (piping components such as tubular connectors, tubular swivel connectors, valves, flanges, and pup joints) which may cause binding and/or failure of the high pressure flowline iron. However, the sliding design of the mounting structure 200 along the rail system 210 allows the wing assemblies 205 to move along a length of the chassis 105 as the piping components of the high pressure manifold 140 expand under high pressure. The movement of the wing assemblies 205 minimizes binding and/or excessive stresses in the high pressure manifold 140 when expansion is encountered, which thereby minimizes premature failures in the high pressure manifold 140.

Figure 3:
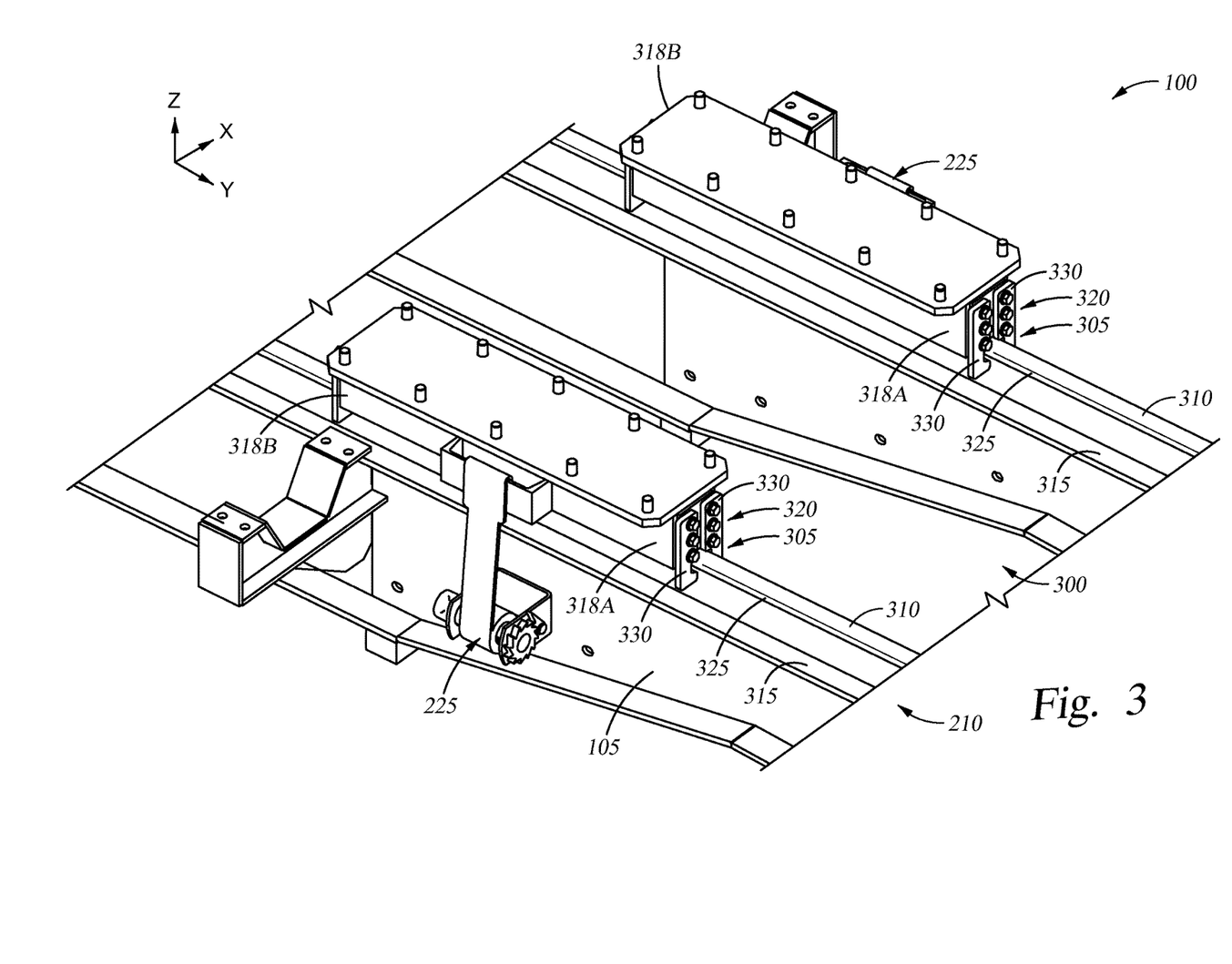
FIG. 3 is a perspective view of a portion of the manifold trailer of FIG. 1 showing one embodiment of a substructure.

FIG. 3 is a perspective view of a portion of the manifold trailer 100 showing one embodiment of a substructure 300 where the wing assemblies 205 may be mounted. The substructure 300 may include a pair of slide assemblies 305 that are movably coupled to the rail system 210. In some embodiments, the slide assemblies 305 may be joined together such that the substructure 300 is a unitary structure.

The rail system 210 includes a pair of rails 310 that are coupled at one end to a flange 315 of the chassis 105, and have at least one flange 325 disposed at an opposite end. The rails 310 may be an I-beam, a channel, crane rail, or railroad track. At least one of the slide assemblies 305 may include a retainer assembly 320 configured to couple and retain the slide assemblies 305 to the flange 325 of the rails 310.

The retainer assembly 320 may be disposed at a first end 318A and a second end 318B of the slide assemblies 305 (although only the retainer assembly 320 at the first end 318A is shown in FIG. 3). The retainer assembly 320 prevents excessive movement of the substructure 300 in the X direction and/or the Z direction as shown in FIG. 3. In some embodiments, the retainer assemblies 320 may provide slight movement of the substructure 300 in the X direction in order to allow room for expansion of the high pressure manifold 140 during a pumping operation. The retainer assemblies 320 include one or more retainer plates 330 that engage the flange 325 of the rails 310. The retainer plates 330 and the flange 325 may be utilized to prevent movement of the substructure 300 in the Z direction.

Figure 4:
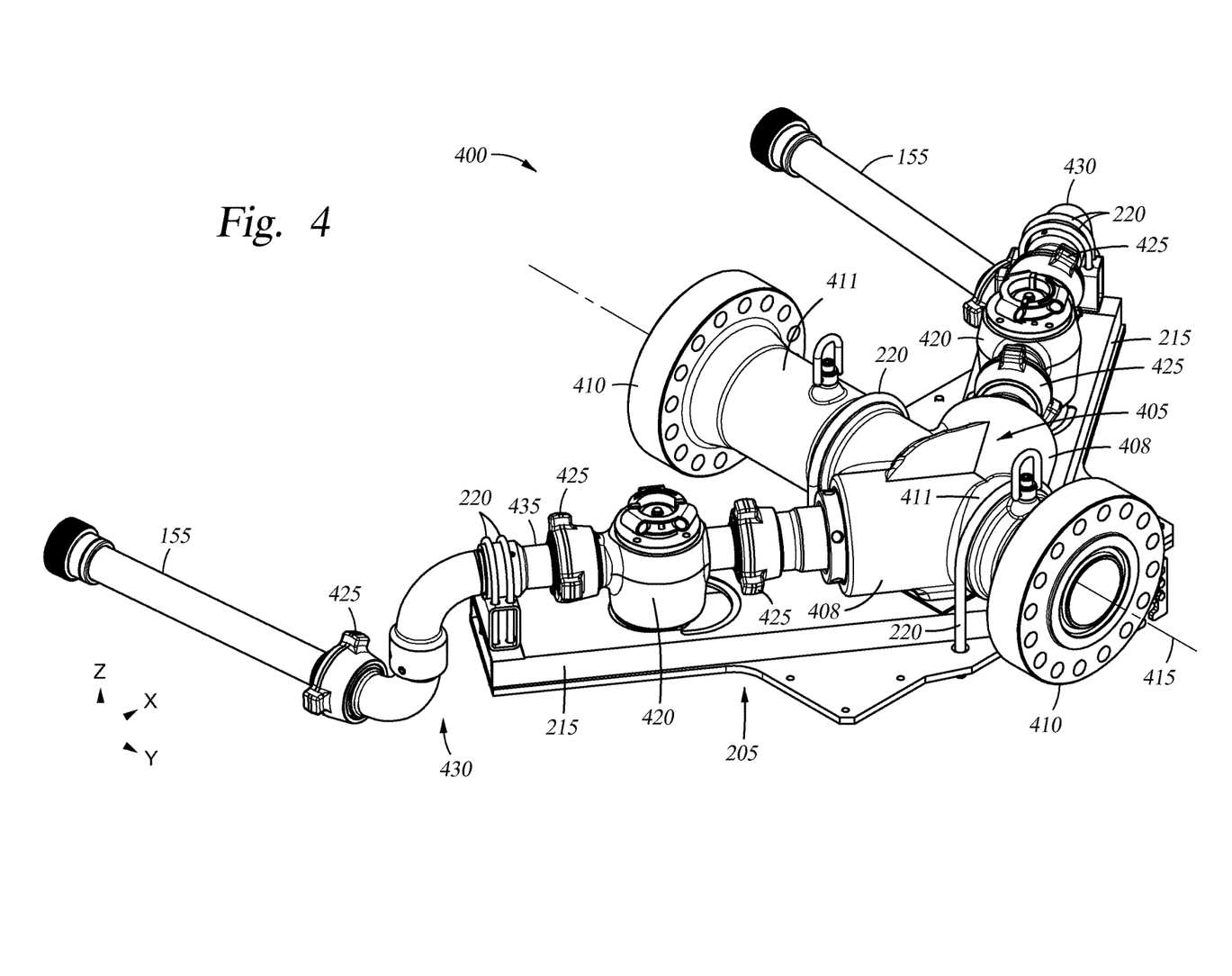
FIG. 4 is a perspective view of one embodiment of a flow assembly that may be used as one or more of the flow assemblies of the high pressure manifold of FIG. 1.

FIG. 4 is a perspective view of one embodiment of a flow assembly 400 that may be used as one or more of the flow assemblies 160 of the high pressure manifold 140 of FIG. 1. The flow assembly 400 is shown coupled to a wing assembly 205. The wing assembly 205 is mounted on the substructure 300 of FIG. 3, which is coupled to the rail system 210 and chassis 105, shown in FIG. 2.

The flow assembly 400 includes a connector 405 that is coupled to the wing assembly 205 by fasteners 220. The connector 405 may be a tubular member having two in-line flow ends 411 and two inlet ends 408 that form the shape of a "crow's foot." The in-line flow ends 411 may be used to couple to other flow assemblies 160 or the splitter 145 (both shown in FIG. 1). The two inlet ends 408 are positioned at an angle relative to the two in-line flow ends 411 to form the shape of a "crow's foot" similar to the shape of the wing assembly 205.

The connector 405 includes flanged ends 410 disposed at opposite ends and along a longitudinal axis 415 of the flow assembly 400 to easily connect to flanged ends 410 of adjacent connectors 405 to form the high pressure manifold 140. The longitudinal axis 415 may also be the longitudinal axis of the high pressure manifold 140 of FIG. 1. The connector 405 and the flanges 410 may be high-pressure piping components that meet American Petroleum Institute (API) standards. An inside diameter of the connector 405 may be about 7 1/16 inches in one embodiment.

Each of the inlet ends 408 are coupled to one end of a high-pressure valve 420 by a union 425. A swivel joint 430 is coupled to the opposite end of each of the high-pressure valves 420 by another union 425. A tubular extension 435 may be disposed between the swivel joint 430 and the high-pressure valve 420. The tubular extension 435 may be a high-pressure tubular member that is coupled to the wing assembly 205 by fasteners 220. The inlet pipe sections 155 may be coupled to the swivel joint 430 by another union 425. In one aspect, each of the inlet pipe sections 155 on opposing sides of the flow assembly 400 share a common fluid conduit, such as the connector 405, according to the high pressure manifold 140 as described herein. In one embodiment, the flow assembly 400 shown in FIG. 4 can be configured with 3 inch, and even up to 4 inch diameter, flowline components (e.g., the connector 405, the tubular extensions 435, valves 420, unions 425, etc.) while staying within the allowable length of the high pressure manifold 140 of FIG. 1.

Figure 5:
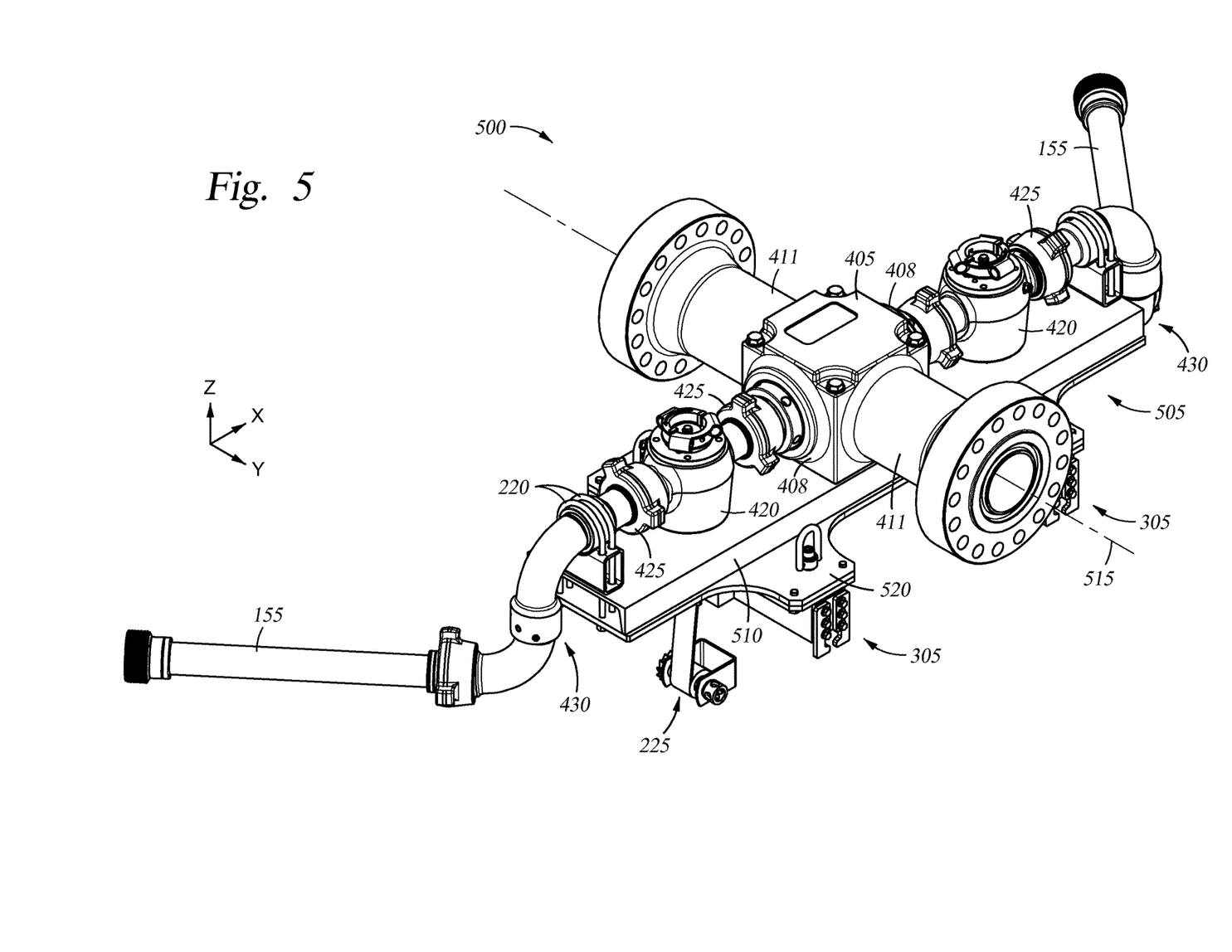
FIG. 5 is a perspective top view of another embodiment of a flow assembly that may be used as one or more of the flow assemblies of the high pressure manifold of FIG. 1.

FIG. 5 is a perspective top view of another embodiment of a flow assembly 500 that may be used as one or more of the flow assemblies 160 of the high pressure manifold 140 of FIG. 1. The flow assembly 500 is substantially similar to the flow assembly 400 shown in FIG. 4 with the following exceptions discussed below. The components of the flow assembly 500 that are similar to the components of the flow assembly 400 are identified with the same reference numerals but a full description of each component is not repeated herein for brevity.

Instead of the flow equipment being coupled to a wing assembly 205 as shown in FIG. 4, the flow assembly 500 includes a cross shaped structure 505. The cross shaped structure 505 is different from the wing assembly 205 described above in that the cross shaped structure 505 includes one or more plates 510 that have a length (in the X direction) or shape that is substantially orthogonal to a longitudinal axis 515 of the flow assembly 500 (along the Y direction). The one or more plates 510 may include a substantially flat base plate that is coupled to (e.g. welded or fastened) to a structural shaped member, such as a C-channel. The longitudinal axis 515 may also be the longitudinal axis of the high pressure manifold 140 of FIG. 1. Thus, the two inlet ends 408 of the connector 405 are disposed in an axis that is orthogonal to the two in-line flow ends 411, as well as the longitudinal axis 515 of the flow assembly 500, thus forming the shape of a "cross." The cross flow of the fluid from the inlet ends 408 into the connector 405 may improve flow dynamics of the high pressure manifold 140 (shown in FIG. 1) as fluid flow from the two inlet ends 408 into the connector 405 is orthogonal to the fluid flow along the longitudinal axis of the high pressure manifold 140. In addition, the connector 405 as shown in FIG. 5 may be reversed, e.g. may be oriented in either direction, which may prolong the operating life of the connector 405 and/or increase ease of assembly. The remaining components (e.g. valves, unions, swivel joints) may be connected to the inlet ends 408 as described above with respect to FIG. 4.

Figure 6:
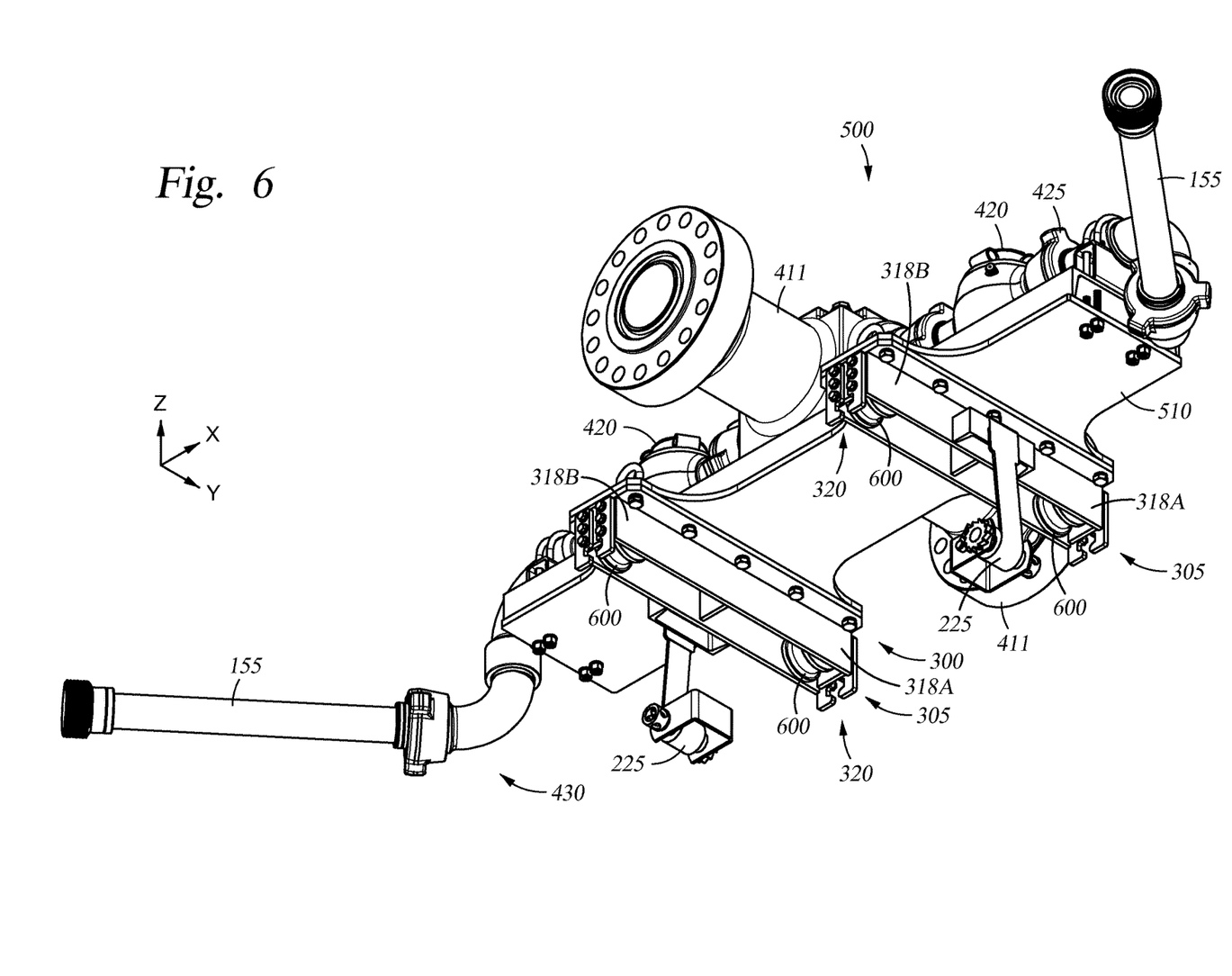
FIG. 6 is a perspective bottom view of the flow assembly of FIG. 5.

FIG. 6 is a perspective bottom view of the flow assembly 500 of FIG. 5. The flow assembly 500 may be coupled to the substructure 300 as described in more detail in FIG. 3, which is coupled to the rail system 210 and the chassis 105, shown and described in FIGS. 2 and 3. As shown, the slide assemblies 305 include one or more rollers 600 disposed on one or both of the first end 318A and the second end 318B of the slide assemblies 305. The rollers 600 may be utilized to reduce friction between the slide assemblies 305 and the rail system 210 when the flow assemblies 400, 500 are moved during rig up, take down, or when in use.

Embodiments of the manifold trailer 100 as described herein utilizes a single high pressure manifold 140 as opposed to multiple high-pressure manifolds as used in conventional manifold trailers. The single high pressure manifold 140 eliminates tolerance stack issues that are common with high pressure manifolds as used in conventional manifold trailers. The manifold trailer 100 is easier to rig up and teardown, which simplifies maintenance, certification, and re-assembly. The manifold trailer 100 as described herein also improves safety and reduces stresses and/or failure points, which thereby reduces costs. The manifold trailer 100, having the various flow assemblies 400 and 500 as described herein, may be used with different sizes of piping (e.g., 3 inch to 4 inch as examples), and the configurations of the crow's foot and/or cross shaped flow from the inlet ends 408 into the connectors 405 may improve flow dynamics of the fluid flow along the longitudinal length of the manifold trailer 100. The manifold trailer 100 as described herein may be easier to manufacture than conventional manifold trailers.

While the foregoing is directed to embodiments of the present disclosure, other and further embodiments of the disclosure thus may be devised without departing from the basic scope thereof, and the scope thereof is determined by the claims that follow.

The invention claimed is:

1. A manifold trailer, comprising:
   a chassis;
   a low pressure piping system disposed along a length of the chassis; and
   a single high pressure output manifold disposed along the length of the chassis, the high pressure output manifold terminating at a splitter that distributes fluids from the high pressure output manifold to a wellhead, wherein a portion of the high pressure output manifold is movable relative to the chassis along a longitudinal axis thereof by a rail system.

2. The trailer of claim 1, wherein the high pressure output manifold comprises a plurality of flow assemblies coupled together in series along the length of the chassis.

3. The trailer of claim 2, wherein a portion of the flow assemblies are movable relative to the chassis along the longitudinal axis thereof.

4. The trailer of claim 2, wherein each of the flow assemblies are coupled to a respective mounting structure.

5. The trailer of claim 4, wherein a portion of the mounting structures are movable relative to the chassis along the longitudinal axis thereof.

6. The trailer of claim 4, wherein the mounting structures are coupled to the rail system disposed along the length of the chassis.

7. The trailer of claim 4, wherein each mounting structure includes one or more plates that are formed or fitted into a "crow's foot" or "cross" shaped structure.

8. A manifold trailer, comprising:
   a chassis;
   a low pressure piping system disposed along a length of the chassis; and
   a single high pressure output manifold comprising a plurality of flow assemblies coupled together in series along the length of the chassis, wherein each of the flow assemblies are coupled to a respective mounting structure and each mounting structure includes one or more plates that are formed or fitted into a "crow's foot" or "cross" shaped structure.

9. The trailer of claim 8, wherein a portion of the flow assemblies are movable relative to the chassis along a longitudinal axis thereof.

10. The trailer of claim 8, wherein a portion of the mounting structures are movable relative to the chassis along a longitudinal axis thereof.

11. The trailer of claim 8, wherein each of the flow assemblies have a shape that is similar to the shape of the mounting structures.

12. A manifold trailer, comprising:
    a chassis;
    a low pressure piping system disposed along a length of the chassis; and
    a high pressure output manifold comprising a plurality of flow assemblies coupled together in series along the length of the chassis, wherein each of the flow assemblies include an inlet pipe section on each side of the chassis that share a common fluid conduit, wherein each of the flow assemblies are coupled to a rail system disposed along the length of the chassis.

13. The trailer of claim 12, wherein a portion of the flow assemblies are movable relative to the chassis along a longitudinal direction thereof.

14. The trailer of claim 12, wherein each of the flow assemblies are coupled to a respective mounting structure.

15. The trailer of claim 14, wherein a portion of the mounting structures are coupled to the rail system that allows the high pressure output manifold to move along a portion of the length of the chassis.

16. The trailer of claim 12, wherein a portion of the flow assemblies are movable relative to the rail system.

17. A manifold trailer, comprising:
a chassis;
a low pressure piping system disposed along a length of the chassis; and
a single high pressure output manifold disposed along the length of the chassis, the high pressure output manifold terminating at a splitter that distributes fluids from the high pressure output manifold to a wellhead, wherein the high pressure output manifold comprises a plurality of flow assemblies coupled together in series along the length of the chassis, wherein each of the flow assemblies are coupled to a respective mounting structure and the mounting structures are coupled to a rail system disposed along the length of the chassis.

18. A manifold trailer, comprising:
a chassis;
a low pressure piping system disposed along a length of the chassis; and
a single high pressure output manifold disposed along the length of the chassis, the high pressure output manifold terminating at a splitter that distributes fluids from the high pressure output manifold to a wellhead, wherein the high pressure output manifold comprises a plurality of flow assemblies coupled together in series along the length of the chassis, wherein each of the flow assemblies are coupled to a respective mounting structure and each mounting structure includes one or more plates that are formed or fitted into a "crow's foot" or "cross" shaped structure.

19. A manifold trailer, comprising:
a chassis;
a low pressure piping system disposed along a length of the chassis; and
a high pressure output manifold comprising a plurality of flow assemblies coupled together in series along the length of the chassis, wherein each of the flow assemblies include an inlet pipe section on each side of the chassis that share a common fluid conduit, wherein each of the flow assemblies are coupled to a respective mounting structure and a portion of the mounting structures are coupled to a rail system that allows the high pressure output manifold to move along a portion of the length of the chassis.

* * * * *